(12) United States Patent
Goller et al.

(10) Patent No.: US 11,405,190 B2
(45) Date of Patent: Aug. 2, 2022

(54) AGREEMENT OF EXCHANGE KEYS ON THE BASIS OF TWO STATIC ASYMMETRIC KEY PAIRS

(71) Applicant: GIESECKE+DEVRIENT MOBILE SECURITY GMBH, Munich (DE)

(72) Inventors: Gabriel Goller, Augsburg (DE); Sven Bauer, Vaterstetten (DE); Jürgen Pulkus, Munich (DE); Lars Hoffmann, Munich (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 186 days.

(21) Appl. No.: 16/062,283

(22) PCT Filed: Dec. 14, 2016

(86) PCT No.: PCT/EP2016/002111
§ 371 (c)(1),
(2) Date: Jun. 14, 2018

(87) PCT Pub. No.: WO2017/102080
PCT Pub. Date: Jun. 22, 2017

(65) Prior Publication Data
US 2018/0375649 A1 Dec. 27, 2018

(30) Foreign Application Priority Data
Dec. 15, 2015 (DE) .......................... 102015016302.7

(51) Int. Cl.
*G06F 21/00* (2013.01)
*H04L 9/08* (2006.01)
(Continued)

(52) U.S. Cl.
CPC ........ *H04L 9/0844* (2013.01); *H04L 63/0442* (2013.01); *H04L 63/062* (2013.01);
(Continued)

(58) Field of Classification Search
CPC . H04L 9/0844; H04L 63/0442; H04L 63/062; H04L 63/0853; H04L 2209/76;
(Continued)

(56) References Cited

U.S. PATENT DOCUMENTS

| 7,698,565 B1 * | 4/2010 | Bjorn ................... H04L 9/3263 |
| | | 713/186 |
| 9,100,175 B2 | 8/2015 | Nix |

(Continued)

FOREIGN PATENT DOCUMENTS

| EP | 2538606 A1 | 12/2012 |
| WO | 2015124371 A1 | 8/2015 |

OTHER PUBLICATIONS

Barker et al., "Recommendation for Pair-Wise Key Establishment Schemes Using Discrete Logarithm Cryptography," NIST Special Publication 800-56A Revision 2, May 2013, 138 Pages.

(Continued)

*Primary Examiner* — Shewaye Gelagay
*Assistant Examiner* — Michael M Lee
(74) *Attorney, Agent, or Firm* — Workman Nydegger

(57) ABSTRACT

A method for setting up a subscriber identity module for agreeing one or several exchange keys, between a subscriber identity module and a provisioning server includes generating one or several exchange keys from keys of the provisioning server and of the subscriber identity module on a production server and are transmitted into the subscriber identity module and stored, so that the subscriber identity module is put particularly into a state as though it had generated the exchange keys itself. In a method for agreeing one or several exchange keys, between a subscriber identity module and a provisioning server, the subscriber identity module sends its public key to the provisioning server, which subsequently generates the exchange keys.

19 Claims, 1 Drawing Sheet

| | ProdS | -----> | SIM | -----> | OTA S |
|---|---|---|---|---|---|
| 0 | | | | | CREATE: PubK(OTA) PrivK(OTA) |
| 1 | GET: PubK(OTA) | | | | |
| 2 | CREATE: PubK(SIM) PrivK(SIM) Nonce N | | | | |
| 3 | CREATE: Secr Z {PubK(OTA), PrivK(SIM)} | | | | |
| 4 | CREATE K (Z, N) ; Cert {PubK(SIM)} ; {ksym} | | | | |
| 5 | | K; N; Cert {PubK(SIM)} {ksym} | | | |
| 6 | DELETE: PubK(SIM), PrivK(SIM), Z, N, {k} | K; N; PubK(SIM); Cert{..}; {ksym} | | | |
| 7 | | FELD | | | |
| 8 | | | PLAIN: N; Cert {PubK(SIM)} {ENC: Dat} | | |
| 9 | | | | | VERIFY: PubK(SIM) |
| 10 | | | | | CREATE: Secr Z {PubK(SIM), PrivK(OTA)}; K [Z, N] {DEC: eDat} |
| 11 | | | | <-------> | ENC-K (PrDat) |

(51) Int. Cl.
  *H04L 9/40* (2022.01)
  *H04W 12/04* (2021.01)
  *H04W 12/30* (2021.01)
  *H04W 8/18* (2009.01)
(52) U.S. Cl.
  CPC ......... *H04L 63/0853* (2013.01); *H04W 8/183* (2013.01); *H04W 12/04* (2013.01); *H04W 12/35* (2021.01); *H04L 2209/76* (2013.01); *H04L 2209/80* (2013.01)
(58) Field of Classification Search
  CPC .. H04W 12/0023; H04W 8/183; H04W 12/04
  See application file for complete search history.

(56) References Cited

U.S. PATENT DOCUMENTS

| | | | | |
|---|---|---|---|---|
| 2006/0013402 | A1* | 1/2006 | Sutton, II | H04L 9/0844 380/282 |
| 2014/0219448 | A1* | 8/2014 | Froels | H04L 9/14 380/255 |
| 2015/0124961 | A1* | 5/2015 | Lambert | H04L 9/0861 380/44 |
| 2015/0149776 | A1* | 5/2015 | Chastain | H04L 9/0877 713/169 |
| 2015/0163056 | A1* | 6/2015 | Nix | H04L 63/0435 380/46 |
| 2015/0372811 | A1* | 12/2015 | Le Saint | G06Q 20/3829 705/76 |
| 2016/0183086 | A1* | 6/2016 | Sharaga | H04W 12/04 455/411 |
| 2016/0352710 | A1* | 12/2016 | Hibshoosh | H04L 63/061 |

OTHER PUBLICATIONS

Doherty et al., "Dynamic Symmetric Key Provisioning Protocol (DSKPP)," KEYPROV Working Group, Jul. 8, 2007, 100 Pages.
German Search Report from DE Application No. DE 10 2015 016 302.7, dated Oct. 6, 2016.
International Search Report from PCT Application No. PCT/EP2016/002111, dated Feb. 3, 2017.

* cited by examiner

| | ProdS | -----> | SIM | -----> | OTA S |
|---|---|---|---|---|---|
| 0 | | | | | CREATE:<br>PubK(OTA)<br>PrivK(OTA) |
| 1 | GET:<br>PubK(OTA) | | | | |
| 2 | CREATE:<br>PubK(SIM)<br>PrivK(SIM)<br>Nonce N | | | | |
| 3 | CREATE:<br>Secr Z<br>(PubK(OTA),<br>PrivK(SIM)) | | | | |
| 4 | CREATE<br>K (Z, N) ;<br>Cert<br>(PubK(SIM))<br>; {ksym} | | | | |
| 5 | | K; N; Cert<br>(PubK(SIM))<br>{ksym} | | | |
| 6 | DELETE:<br>PubK(SIM),<br>PrivK(SIM),<br>Z, N, {k} | | K; N;<br>PubK(SIM);<br>Cert(...);<br>{ksym} | | |
| 7 | | | FELD | | |
| 8 | | | | PLAIN:<br>N; Cert<br>(PubK(SIM))<br>{ENC: Dat} | |
| 9 | | | | | VERIFY:<br>PubK(SIM) |
| 10 | | | | | CREATE:<br>Secr Z<br>(PubK(SIM),<br>PrivK(OTA));<br>K (Z, N)<br>{DEC: eDat} |
| 11 | | | | <--------> | ENC-K<br>(PrDat) |

AGREEMENT OF EXCHANGE KEYS ON THE BASIS OF TWO STATIC ASYMMETRIC KEY PAIRS

FIELD OF THE INVENTION

The invention relates to a method for the agreement of exchange keys between a subscriber identity module and a provisioning server, proceeding from a static individual asymmetric key pair of the subscriber identity module and a static asymmetric key pair of the provisioning server. Such a method is disclosed in NIST SP 800-56Ar2 as C(0e, 2s) key scheme.

STATE OF THE ART

The world is networked in mobile manner, and mobile networking is developing further. Mobile and stationary terminals communicate via mobile communication networks. Classic mobile terminals include smart phones and mobile phones. Terminals that can be stationary or mobile, depending on the specific application case, include regulation devices (control devices or measuring devices or combined control/measuring devices) for industrial facilities in the commercial or private environment. Industrial facilities are for example production plants, which have one or several regulation devices (terminals) which can communicate with a background system and/or with each other via a mobile communication network. Other industrial facilities are smart home equipment such as heaters or electricity consumers with terminals in the form of regulation devices.

For use of a terminal, in particular a mobile terminal such as a smart phone or mobile phone, in a mobile communication network of a network operator, the terminal contains a subscriber identity module with a subscription profile or briefly profile. The profile achieves the configuration of the terminal and of the connection of the terminal in the mobile communication network. The profile is formed by a data set allowing the establishment, operation and breaking of a connection of the terminal in the mobile communication network, and comprises for example a cryptographic authentication key Ki and an International Mobile Subscriber Identity IMSI.

The subscriber identity module can be formed either as a removable plug-in SIM card (SIM=Subscriber Identity Module) or USIM card (Universal SIM) or UICC (Universal Integrated Circuit Card), or alternatively as a permanently soldered in eUICC (embedded UICC) or eSIM or eUSIM, or further alternatively, as an integrated UICC or IUICC (or iSIM, iUSIM, etc.), integrated on the chip area of a chip (silicon-on-chip SoC) of the terminal, or further alternatively, as a software SIM purely formed in software.

The profile of a subscriber identity module can be edited, for example set up, deleted, changed, updated, etc., by a provisioning server or OTA server via a remote connection (remote). The editing of profiles in a subscriber identity module including setting up, deleting, changing, etc. of profiles is also referred to as provisioning of the subscriber identity module. To enable the operation of a secure, in particular encrypted and/or authenticated, connection between the subscriber identity module and the provisioning server, it is required that the subscriber identity module and the provisioning server agree among themselves exchange keys for encryption and/or authentication.

The agreement of exchange keys can be effected in principle based on asymmetric cryptography or on symmetric cryptography.

The document [1] NIST SP 800-56Ar2, *MST Special Publication 800-56A Revision 2, Recommendation for Pair-Wise Key Establishment Schemes Using Discrete Logarithm Cryptography*, discloses a method for agreeing exchange keys between two parties based on asymmetric cryptography (e.g. Diffie-Hellman). [1] Chap. 6.3 discloses in more detail the C(0e, 2s) key scheme for agreeing exchange keys, between a party U and a party V. In sub-chapters of 6.3 several embodiments of the C(0e, 2s) key scheme are described in detail. In the C(0e, 2s) key scheme each of the two parties U, V determines its own static asymmetric key pair PrivK-PubK, each with a private key PrivKU/V and a public key PubKU/V (2s=two static key pairs). One of the two parties, here U, also additionally determines a random nonce N (a random number), for example by U generating the nonce N. The party U sends the nonce N to the party V. The parties U, V send each other their public keys PubKU and PubKV. Each party (U, V) derives from its own private key PrivK(U,V) and the public key PubK(V,U) of the respectively other party (V, U) a shared secret Z (i.e. the party U and the party V now each have the same secret Z). Each of the two parties U, V computes the exchange key K from the shared secret Z and the random nonce N. The C(0e, 2s) key scheme can be formed in particular as a Diffie-Hellman DH key scheme, or more accurately as a Finite Field Cryptography FFCDH or alternatively as an Elliptic Curve Cryptography ECC CDH key scheme. The computation of the exchange key K from the secret Z and the nonce N is effected according to any key derivation method specified in chapter 5.8, and by means of an algorithm determined between the parties. The secret Z is generated, employed for deriving the exchange keys K, and then destroyed again (for example deleted). The exchange keys K are designated in the following by K. K can denote a number of one, two, several, . . . individual keys here.

Methods for agreeing exchange keys based on asymmetric cryptography, such as the C(0e, 2s) key scheme, require that both parties U, V can perform computations for agreeing the exchange keys K. Some subscriber identity modules have relatively limited quantities of computing power and storage capacity and can be unable to cope with computations for deriving the exchange keys K as specified in [1] NIST SP 800-56Ar2. An advantage of asymmetric methods is that the parties do not exchange secret exchange keys directly, but only exchange non-critical precursors of secret exchange keys and each compute the secret exchange keys themselves.

A method for agreeing exchange keys based on symmetric cryptography is based on the exchange keys being encrypted with a symmetric master key which both parties have. In the case of subscriber identity modules and provisioning servers, for example the exchange keys individual for each subscriber identity module are encrypted with the same master key which the provisioning server has. A provisioning server intending to send provisioning data securely to a subscriber identity module, has the subscriber identity module send it the individual exchange keys encrypted with the master key, receives the encrypted exchange keys and decrypts them with the master key. Subsequently, the provisioning server encrypts the provisioning data exchange with an exchange key of the subscriber identity module and sends the encrypted provisioning data to the subscriber identity module. A spying out of the master key means that the secret exchange keys of all subscriber identity modules in which the master key has been employed become public. An advantage of symmetric methods is that the subscriber identity module requires only small quantities of computing power and storage capacity, so that also less powerful subscriber identity modules can use symmetric methods.

The document [2] WO 2015/124371 A1 discloses a method for transmitting a permanent individual random key by one UICC from a plurality of UICCs which each have such a random key, to a remote server via a secure channel upon a first-time connection of the UICC with the server. Temporary secret data SD0 and SD1 for setting up the secure channel were stored in the UICC and/or the server prior to establishing the first-time connection and can also be deleted again after terminating the connection. Since a random key is employed as individual key and not a key derived from a master key, there is no master key whose loss would be a security risk.

SUMMARY OF THE INVENTION

It is the object of the invention to create a method for the agreement of exchange keys between a subscriber identity module and a provisioning server, which is applicable also for subscriber identity modules with small quantities of computing power and/or storage capacity, and which is secure at the same time.

The object is achieved by a method according to claim 1. Advantageous embodiments of the invention are specified in the dependent claims.

The method according to claim 1 is adapted for setting up a subscriber identity module for agreeing one or several exchange keys, between a subscriber identity module and a provisioning server, proceeding from asymmetric key data.

The key data comprise an individual asymmetric key pair of the subscriber identity module. The key pair comprises a private key, hereinafter also referred to as PrivK(SIM), and a public key, hereinafter also referred to as PubK(SIM). The key data further comprise a static asymmetric key pair of the provisioning server, comprising a private key, referred to as PrivK(OTA), and a public key, referred to as PubK(OTA).

The method comprises the steps of:
a) generating the asymmetric static key pair individual for the subscriber identity module, comprising the public key PubK(SIM) and the private key PrivK(SIM);
b) generating the asymmetric key pair of the provisioning server, comprising the public key PubK(OTA) and the private key PrivK(OTA);
c) generating the one or several exchange keys employing the private key PrivK(SIM) of the subscriber identity module and the public key PubK(OTA) of the provisioning server.

The method is characterized in that step a) and step c) are performed on a production server and the method comprises the further step of:
d) transmitting and storing the one or several exchange keys generated on the production server in step c) from the production server into the subscriber identity module, so that the subscriber identity module is particularly put into a state as though it had generated the exchange keys itself.

The invention has the following advantages. No master key is employed, with which the individual exchange keys of a multiplicity of subscriber identity modules could be spied out. In transmission processes between the subscriber identity module and servers (production server and provisioning server) no secret keys are transmitted, but only public or non-critical data. In particular, no private asymmetric keys are transmitted. Private asymmetric keys are kept available only in secure environments, in particular in the production environment of the production server or on the trusted provisioning server. In the subscriber identity module itself no asymmetric cryptography is required, so that the method is also applicable for low-priced, less powerful subscriber identity modules.

Therefore, according to claim 1, a method is created for agreeing exchange keys between a subscriber identity module and a provisioning server, which is also applicable for subscriber identity modules with small quantities of computing power and/or storage capacity, and which is secure at the same time.

A key generation is performed in each case on a processor/a CPU of the respective entity (e.g. server). Storing keys, certificates, or possibly other data in the subscriber identity module is performed respectively in a memory of the subscriber identity module, preferably in a persistent memory. The production server and provisioning server likewise have the necessary memories.

In the method, step c) optionally comprises the following partial steps:
c1) generating a secret employing the private key of the subscriber identity module and the public key of the provisioning server;
c2) optionally generating or supplying a random nonce;
c3) generating the exchange keys proceeding from the secret and the nonce, where applicable.

The generating method for the secret employing a nonce corresponds to the generating method for the secret Z according to the C(0e, 2s) key scheme from [1] NIST SP 800-56Ar2, chapter 6.3. The generating method is possible also without a nonce, however.

Optionally, step b), generating the asymmetric key pair of the provisioning server, is performed either, according to a first alternative, on the production server. Here, at least the private key generated in step b) (during the production phase) is supplied to the provisioning server. Alternatively, according to a second alternative, step b), generating the asymmetric key pair of the provisioning server, is performed on the provisioning server. In this case, at least the public key generated in step b) is supplied to the production server. In other words, the one party of the production server and the provisioning server generates the key pair. The other party is supplied with that key of the key pair which it needs. It is emphasized again at this point that the key exchange processes described take place in a secure production environment, and not in the field.

Optionally, the transmission step d) further comprises: transmitting and storing the public key of the subscriber identity module into the subscriber identity module. The public key of the subscriber identity module can then be transmitted in particular as needed to a provisioning server later on, and can be employed for deriving the exchange keys and the secret, where applicable.

Optionally, the transmission and storing of the public key is performed by directly transmitting and storing the public key to the subscriber identity module. While so doing, optionally additional authentication information is transmitted to the subscriber identity module and stored there. The authentication information permits an authentication of the public key stored in the subscriber identity module, thus has an effect that is comparable to that of the certificate mentioned below.

Optionally the method further comprises the step of: generating a certificate over the public key of the subscriber identity module by signing the public key of the subscriber identity module with the secret key of a trusted entity. Here, step d) comprises transmitting and storing the public key through transmitting and storing the certificate. The public key is transmitted within the certificate here. By means of the certificate, the authenticity of the public key can be verified. Either the necessary public key is extracted from the certificate. The extraction is effected in the subscriber identity module, or later on in a provisioning server, where applicable. The certificate thus serves both for key transmission and authentication of the public key. Alternatively, the public key is transmitted in addition to the certificate.

In a method according to the invention for agreeing one or several exchange keys between a subscriber identity module (SIM) and a provisioning server asymmetric key data are proceeded from.

e) First, a subscriber identity module set up with a method according to the invention is supplied, in which the exchange keys and in addition its own public key have been stored. Further, a communication connection is established between the subscriber identity module and the provisioning server.

f) The public key of the subscriber identity module is transmitted from the subscriber identity module via the communications connection to the provisioning server.

g) In the provisioning server, the public key of the subscriber identity module is received. The subscriber identity module is identified by means of the received public key. The identification of the subscriber identity module can be effected in a working memory, for example especially in a volatile working memory.

h) In the provisioning server its proprietary private key is supplied, for example to the processor/CPU of the provisioning server.

i) In the provisioning server further the one or several exchange key(s) is/are generated employing the public key of the subscriber identity module and its own private key, in particular on the processor/CPU of the provisioning server.

Now the provisioning server has the same key material as the subscriber identity module and can exchange data in encrypted manner with the subscriber identity module.

Step i) optionally comprises the partial steps of: i1) generating the secret employing the public key of the subscriber identity module and the private key of the provisioning server. i2) Generating the exchange key proceeding from the secret (and possibly the nonce (N), see below). Step f) further comprises optionally, if a nonce is employed: transferring the nonce from the subscriber identity module to the provisioning server. In this case in which a nonce is employed, the exchange keys are computed proceeding from the secret and employing the nonce.

Optionally, after generating the one or several exchange keys, the asymmetric key data are destroyed, in particular deleted, as soon as they are no longer needed.

Optionally, after generating the one or several exchange keys, the secret is destroyed, in particular deleted, as soon as it is no longer needed.

In a method for transmitting encrypted data between a subscriber identity module and a provisioning server, the data are encrypted with exchange keys at the subscriber identity module or at the provisioning server, said exchange keys having been generated with a method according to the invention, and are transmitted to the other party (provisioning server or subscriber identity module).

As asymmetric key pairs optionally Diffie-Hellman key pairs are provided, in particular a Diffie-Hellman key pair of the subscriber identity module and a Diffie-Hellman key pair of the provisioning server.

BRIEF DESCRIPTION OF THE DRAWINGS

In the following the invention will be explained in more detail on the basis of embodiment examples and with reference to the drawing, in which there is shown:

FIG. 1 a system for illustrating the invention.

DETAILED DESCRIPTION OF EMBODIMENT EXAMPLES

FIG. 1 shows a system for illustrating the invention. The system comprises a production server ProdS, a subscriber identity module SIM and a provisioning server or OTA server OTA S. The production server ProdS and the provisioning server OTA S have an asymmetric cryptographic algorithm and a processor, for example a CPU and/or a crypto co-processor, for executing the asymmetric cryptographic algorithm, thus to perform asymmetric cryptographic computations. In FIG. 1 pseudo-commands are shown set in uppercase, comprising GET for receiving data, CREATE for generating data, DELETE for deleting data and VERIFY for the verification of data, PLAIN for unencrypted data transmission, ENC for encryption or encrypted property of data, DEC for decryption or decrypted property of data. Between the entities production server ProdS and subscriber identity module SIM and between the entities subscriber identity module SIM and provisioning server OTA S there extend arrows to indicate data transmission between entities.

The production server ProdS is located at a manufacturer of subscriber identity modules for personalizing the subscriber identity modules, for example by programming into the respective subscriber identity module SIM the individual International Subscriber Mobile Identity IMSI, the individual authentication key Ki and data of this kind. The invention assumes that the production server ProdS currently has the task of programming a specific individual subscriber identity module SIM. For the programming of several subscriber identity modules SIM, the method would be performed in principle substantially several times.

According to the invention, additional production steps are effected within the scope of the production of the subscriber identity module SIM, which are not effected in the conventional production. Here, the subscriber identity module SIM is programmed with additional data, which, later when the subscriber identity module SIM is in the field and logs into a communication network (mobile communication network), will give the subscriber identity module SIM the appearance of being set up for performing computations in accordance with an asymmetric crypto-algorithm, for example for a Diffie-Hellman key agreement method.

In a step 0 an asymmetric, for example Diffie-Hellman, key pair is generated by the provisioning server OTA S which is intended to send encrypted data to the subscriber identity module SIM later on, when the subscriber identity module SIM is in the field, said asymmetric key pair comprising a public key PubK(OTA) and a private key PrivK(OTA).

In a step 1, the provisioning server OTA S supplies the public key PubK(OTA) to the production server ProdS, or the production server ProdS retrieves the key PubK(OTA) from the provisioning server OTA S (pseudo command "GET").

In a step 2 the production server ProdS generates (CREATE) an individual asymmetric, for example Diffie-Hellman, key pair for the subscriber identity module SIM, said asymmetric key pair comprising an individual public key PubK(SIM) and an individual private key PrivK(SIM), which are individual for the subscriber identity module SIM. Further, the production server ProdS generates (CREATE) a random nonce N.

In a step 3 the production server ProdS generates (CREATE) a secret Z, which is likewise individual for the subscriber identity module SIM, from the public key PubK (OTA) the provisioning server OTA S and the private key PrivK(SIM) of the subscriber identity module SIM. The secret Z is computed for example according to the C(0e, 2s) key scheme, as described in the document [1] NIST SP 800-56Ar2, chap. 6.3.

In a step 4 the production server ProdS generates (CREATE) the exchange keys K for the subscriber identity module SIM, which are now likewise individual for the subscriber identity module SIM, from the secret Z and the nonce N. Further, by signing the public key of the subscriber identity module SIM, the production server ProdS generates a certificate Cert(PubK(SIM)) or briefly Cert( . . . ). By means of the certificate Cert( . . . ) the provisioning server OTA S can verify later whether the exchange keys K of the subscriber identity module SIM actually come from a permissible production site, and have not been generated by an attacker himself. Optionally, the production server ProdS also generates at this point a symmetric key k for the encrypted exchange of other data, for example of accompanying data. The symmetric key k is mentioned for the sake of completeness, and not essential to the invention.

In a step 5, the necessary data are transmitted from the production server ProdS to the subscriber identity module SIM. In particular, the exchange key K, the nonce N and the certificate Cert(PubK(SIM)) are transmitted. By transmitting the certificate, the public key PubK(SIM) is transmitted implicitly to the subscriber identity module SIM. Optionally, the public key PubK(SIM) can be transmitted explicitly in addition. Optionally, the symmetric key k is transmitted as well, where applicable.

In a step 6, the following data are stored in the subscriber identity module SIM: the exchange keys K, the nonce N, the public key PubK(SIM) (now explicitly, i.e. outside of the certificate, for which purpose the public key PubK(SIM) has been extracted previously from the certificate Cert( . . . ), where applicable), and the certificate Cert( . . . ). Optionally, the symmetric key k is stored in the subscriber identity module SIM, where applicable. The data stated are stored here in a persistent, non-volatile memory of the subscriber identity module SIM. In the production server ProdS the two keys public key PubK(SIM) and private key PrivK(SIM) of the asymmetric key pair of the subscriber identity module SIM and the public key PubK(OTA) the provisioning server OTA S are deleted at any desired time after the generation of the secret Z.

In step 7, the subscriber identity module SIM is put into the field. For this purpose, the subscriber identity module SIM is passed to a merchant or end user, for example. It is irrelevant whether the subscriber identity module SIM is put into the field as a plug-in module, i.e. SIM card or USIM card, etc., or as a firmly implemented, "embedded" eUICC or "integrated" iUICC, already together with a terminal. In the case of a plug-in module, the subscriber identity module SIM is inserted in a terminal (e.g. smart phone) in addition.

In a step 8, by means of the terminal in which it is operated, the subscriber identity module SIM contacts the provisioning server OTA S to retrieve data. In this case, the subscriber identity module SIM sends to the provisioning server OTA S, in unencrypted plain text form (PLAIN), its public asymmetric key PubK(SIM), the certificate Cert( . . . ) over its public asymmetric key PubK(SIM) and the nonce N.

In a step 9, the provisioning server OTA S verifies the certificate Cert( . . . ) received from the subscriber identity module SIM and thereby verifies the public asymmetric key PubK(SIM) of the subscriber identity module SIM. If the verification fails, the method of key agreement ends here, and can be restarted, where applicable. If the verification of the asymmetric key PubK(SIM) of the subscriber identity module SIM is successful, the method of key agreement will be continued with step 10.

In step 10, the provisioning server OTA S generates the secret Z from the public asymmetric key PubK(SIM) received from the subscriber identity module SIM and with its own private asymmetric key PrivK(OTA). With the self-generated secret Z and the nonce N received from the subscriber identity module SIM the provisioning server OTA S generates (CREATE) the exchange keys K. Now, the provisioning server OTA S has the exchange keys K for encrypted data exchange with the subscriber identity module SIM, as if the subscriber identity module SIM itself had performed a key agreement method such as Diffie-Hellman.

In a step 11, the provisioning server OTA S sends to the subscriber identity module SIM encrypted provisioning data PrDat that are encrypted with an encryption key from the exchange keys K. If necessary, authentications are performed with authentication keys from the exchange keys K. If necessary, the subscriber identity module SIM sends to the provisioning server OTA S encrypted data which are likewise encrypted with an encryption key from the exchange keys K.

CITED PRIOR ART

[1] NIST SP 800-56Ar2, NIST Special Publication 800-56A Revision 2, Recommendation for Pair-Wise Key Establishment Schemes Using Discrete Logarithm Cryptography
[2] WO 2015/124371 A1

The invention claimed is:

1. A method for setting up a subscriber identity module foran agreement of one or several exchange keys, between the subscriber identity module and a provisioning server, proceeding from asymmetric key data, the asymmetric key data comprising an individual static asymmetric key pair of the subscriber identity module, comprising a private key and a public key of the subscriber identity module, and a static asymmetric key pair of the provisioning server, comprising a private key and a public key of the provisioning server, the method comprising:

a) generating the asymmetric key pair for the subscriber identity module, comprising the public key and the private key of the subscriber identity module;
b) generating the asymmetric key pair of the provisioning server, comprising the public key and the private key of the provisioning server;
c) generating said one or several exchange keys employing the private key of the subscriber identity module and the public key of the provisioning server;

wherein step a) and step c) are performed on a production server during a production of the subscriber identity module, and the method further comprises:

d) transmitting and storing the public key of the subscriber identity module and the one or several exchange keys generated in step c) on the production server into the subscriber identity module and configuring the subscriber identity module to be programmed, at a time after the production and delivery of the subscriber identity module, with additional data, wherein the additional data includes authentication information which permits an authentication of the public key stored in the subscriber identity module, in a logging into a communication network by the subscriber identity module, gives the subscriber identity module an appearance of being set up for performing computations in accordance with an asymmetric crypto-algorithm and the subscriber identity module is put into a state as though the subscriber identity module had generated the exchange keys itself.

2. The method according to claim 1, wherein step c) further comprises:
  c1) generating a secret employing the private key of the subscriber identity module and the public key of the provisioning server;
  c2) generating or supplying a random nonce;
  c3) generating the exchange keys proceeding from the secret and the nonce.

3. The method according to claim 1, wherein step b) is performed on the production server, and wherein at least the private key generated in step b) is supplied to the provisioning server.

4. The method according to claim 1, wherein step d) comprises:
  transmitting and storing the public key of the subscriber identity module by directly transmitting and storing the public key of the subscriber identity module.

5. The method according to claim 1, further comprising: generating a certificate over the public key of the subscriber identity module by signing the public key of the subscriber identity module; wherein step d) comprises: transmitting and storing the public key by transmitting and storing the certificate.

6. The method according to claim 1, wherein for the agreement of one or several exchange keys, between the subscriber identity module and the provisioning server, proceeding from the asymmetric key data, the method further comprising:
  e) supplying a subscriber identity module set up and establishing a communication connection between the subscriber identity module and the provisioning server;
  f) transferring the public key of the subscriber identity module from the subscriber identity module to the provisioning server;
  g) in the provisioning server receiving the public key of the subscriber identity module and identifying the subscriber identity module by means of the received public key;
  h) in the provisioning server supplying the private key of the provisioning server;
  i) in the provisioning server generating the one or several exchange keys employing the public key of the subscriber identity module and the private key of the provisioning server.

7. The method according to claim 6, wherein: step c) comprises:
  c1) generating a secret employing the private key of the subscriber identity module and the public key of the provisioning server;
  c2) generating or supplying a random nonce;
  c3) generating the exchange keys proceeding from the secret and the nonce;
  wherein when a nonce is used, step f) further comprises: transferring said nonce from the subscriber identity module to the provisioning server;
  and step i) comprises:
  i1) generating the secret employing the public key of the subscriber identity module and the private key of the provisioning server;
  i2) generating the exchange key proceeding from the secret and the nonce.

8. The method according to claim 2, wherein the secret is destroyed by being deleted after the one or several exchange keys are generated.

9. The method according to claim 1, further comprising encrypting data with the one or several exchange keys, and transmitting the encrypted data between the subscriber identity module and the provisioning server.

10. The method according to claim 1, wherein the asymmetric key pairs are provided as Diffie-Hellman key pairs, including a Diffie-Hellman key pair of the subscriber identity module and another Diffie-Hellman key pair of the provisioning server.

11. The method according to claim 1, wherein step b) is performed on the provisioning server, and wherein at least the public key generated in step b) is supplied to the production server.

12. The method according to claim 1, wherein no master key is employed.

13. The method according to claim 1, wherein in step d), in transmission processes between the subscriber identity module and the production server or the provisioning server, no secret keys are transmitted.

14. The method according to claim 1, wherein in step d), in transmission processes between the subscriber identity module and the production server or the provisioning server, no private asymmetric keys are transmitted.

15. The method according to claim 1, wherein in step d), in transmission processes between the subscriber identity module and the production server or the provisioning server, only public or non-critical data are transmitted.

16. The method according to claim 1, wherein private asymmetric keys are kept available only in secure environments.

17. The method according to claim 1, wherein private asymmetric keys are kept available only in a production environment of the production server or on the provisioning server.

18. The method according to claim 1, wherein in the subscriber identity module no asymmetric cryptography is required or performed.

19. The method according to claim 1, wherein the subscriber identity module does not have sufficient computing power or storage capacity for asymmetric cryptography or for deriving the one or several exchange keys.

* * * * *